United States Patent [19]
Meagher et al.

[11] Patent Number: 5,841,086
[45] Date of Patent: Nov. 24, 1998

[54] BRAKE MASTER CYLINDER AND BRAKELAMP SWITCH ASSEMBLY

[75] Inventors: James P. Meagher, Marion County; John W. Smith, Hancock County, both of Ind.

[73] Assignee: Emerson Electric Co., St. Louis, Mo.

[21] Appl. No.: 792,032

[22] Filed: Feb. 3, 1997

[51] Int. Cl.$^6$ ...................................................... H01H 3/14
[52] U.S. Cl. .................................... 200/61.89; 200/61.86; 200/306
[58] Field of Search ...................... 200/61.89, 16 R–16 F, 200/61.86, 61.87, 61.88, 86.5, 306, 82 R, 83 S; 92/5 R

[56] References Cited

U.S. PATENT DOCUMENTS

| | | |
|---|---|---|
| 3,794,147 | 2/1974 | Shellhause . |
| 4,617,855 | 10/1986 | Wrobleski et al. ........................ 92/5 R |
| 4,621,565 | 11/1986 | Leigh-Monstevens ..................... 92/5 R |
| 4,718,324 | 1/1988 | Gautier et al. . |
| 4,742,193 | 5/1988 | Kassin et al. . |
| 4,911,276 | 3/1990 | Leigh-Monstevens et al. . |
| 5,006,677 | 4/1991 | Smith et al. ........................... 200/61.89 |
| 5,066,838 | 11/1991 | Smith et al. . |
| 5,180,211 | 1/1993 | Weise et al. . |
| 5,241,144 | 8/1993 | Meagher et al. . |
| 5,321,219 | 6/1994 | Meagher et al. . |
| 5,343,005 | 8/1994 | Salzmann . |
| 5,390,987 | 2/1995 | Willi et al. . |
| 5,534,672 | 7/1996 | Meagher . |

*Primary Examiner*—Khanh Dang
*Attorney, Agent, or Firm*—Mark D. Becker

[57] ABSTRACT

A brake master cylinder assembly includes a brake master cylinder housing having a rear end surface separated from a front end surface by a side surface, and defines an inner cavity that opens through the front end surface. At least one plunger is positioned in the inner cavity and is moveable between a retracted position and an advanced position. A shaft with one end extending into the inner cavity is in contact with the at least one plunger and has an other end extending out of the inner cavity away from the front end surface. A collapsible cover surrounds a portion of the shaft and has a forward end attached to the shaft and a base end attached to the brake master cylinder housing. An electrical brakelamp switch is attached to the brake master cylinder housing adjacent one of either the front end surface or the rear end surface. The electrical brakelamp switch has a stationary portion with a first electrical contact and a moveable portion with a second electrical contact positioned across from the first electrical contact. Finally, the switch portion of the assembly is sized and arranged in order to prevent damage to the electrical brakelamp switch in the event of hydraulic fluid loss within the brake master cylinder housing and advancement of the shaft to its advanced position.

20 Claims, 11 Drawing Sheets

BRAKE MASTER CYLINDER AND BRAKELAMP SWITCH ASSEMBLY

TECHNICAL FIELD

This invention relates generally to brake master cylinders and brake switches, and more particularly to a brake switch that is attached directly to a brake master cylinder housing.

BACKGROUND OF THE INVENTION

Current production brakelamp switches require adjustment by the assembly operator when installed. This adds labor and the possibility of switch misadjustment due to operator error or system noise variables. Although there exists production brakelamp switches that require no adjustment at installation, they tend to effect the feel of the brake pedal in a manner that is undesirable to the consumer. Thus, there is a need in the art to provide a brakelamp switch that requires no adjustment at the time of installation and does not effect pedal feel.

SUMMARY OF THE INVENTION

In responding to this need, the present invention contemplates a brake master cylinder assembly that includes a brake master cylinder housing having a rear end surface separated from a front end surface by a side surface, and defines an inner cavity that opens through its front end surface. At least one plunger is positioned in the inner cavity and is moveable between a retracted position and an advanced position. A shaft with one end extending into the inner cavity is in contact with the at least one plunger, and an other end that extends out of the inner cavity away from the front end surface. The shaft is moveable into the inner cavity to move the at least one plunger from its retracted position toward its advanced position. In the preferred embodiment, a collapsible cover surrounds a portion of the shaft and has a forward end attached to the shaft adjacent its other end, and a base end attached to the brake master cylinder housing. An electrical brakelamp switch is attached to the brake master cylinder housing adjacent one of either the front end surface or the rear end surface. The electrical brakelamp switch has a stationary portion with a first electrical contact, and a moveable portion with a second electrical contact positioned across from the first electrical contact.

In another embodiment of the present invention, a brake master cylinder housing has a rear end surface separated from a front end surface by a side surface, and defines an inner cavity that opens through the front end surface. At least one plunger is movably positioned in the inner cavity. A shaft has one end extending into the inner cavity in contact with the at least one plunger and an other end extending out of the inner cavity away from the front end surface. The shaft is moveable into the inner cavity between a retracted position and an advanced position. A collapsible cover surrounds a portion Of the shaft and has a forward end attached to the shaft adjacent the other end and a base end attached to the brake master cylinder housing. The collapsible cover is substantially uncollapsed when the shaft is in its retracted position but becomes substantially fully collapsed when the shaft is at its advanced position. An electrical brakelamp switch is attached to the brake master cylinder housing adjacent its front end surface and is positioned within the collapsible cover. The electrical brakelamp switch has a stationary plate with a first electrical contact, and a moveable plate with a second electrical contact position adjacent the first electrical contact.

Both embodiments of the present invention provide some means for preventing damage to the electrical brakelamp switch in the event of hydraulic fluid loss within the brake master cylinder housing and advancement of the shaft to its advanced position.

One object of the present invention is to provide a brake master cylinder assembly that includes a brakelamp switch that needs no adjustment at the time of installation.

Another object of the present invention is to provide a brakelamp switch that remains undamaged in the event of hydraulic fluid loss when the brake pedal is pushed to its maximum position.

Still another object of the present invention is to provide a brake switch that does not affect a pedal feel.

Another object of the present invention is to provide a brake switch whose electrical contacts can be reliably placed a relatively short distance apart by coupling the switch to a locating surfaces on the brake master cylinder.

Still another object of the present invention is to integrate a brake switch into a brake master cylinder assembly without having to modify the current structure of the brake master cylinder.

DETAILED DESCRIPTION

Figure 1:
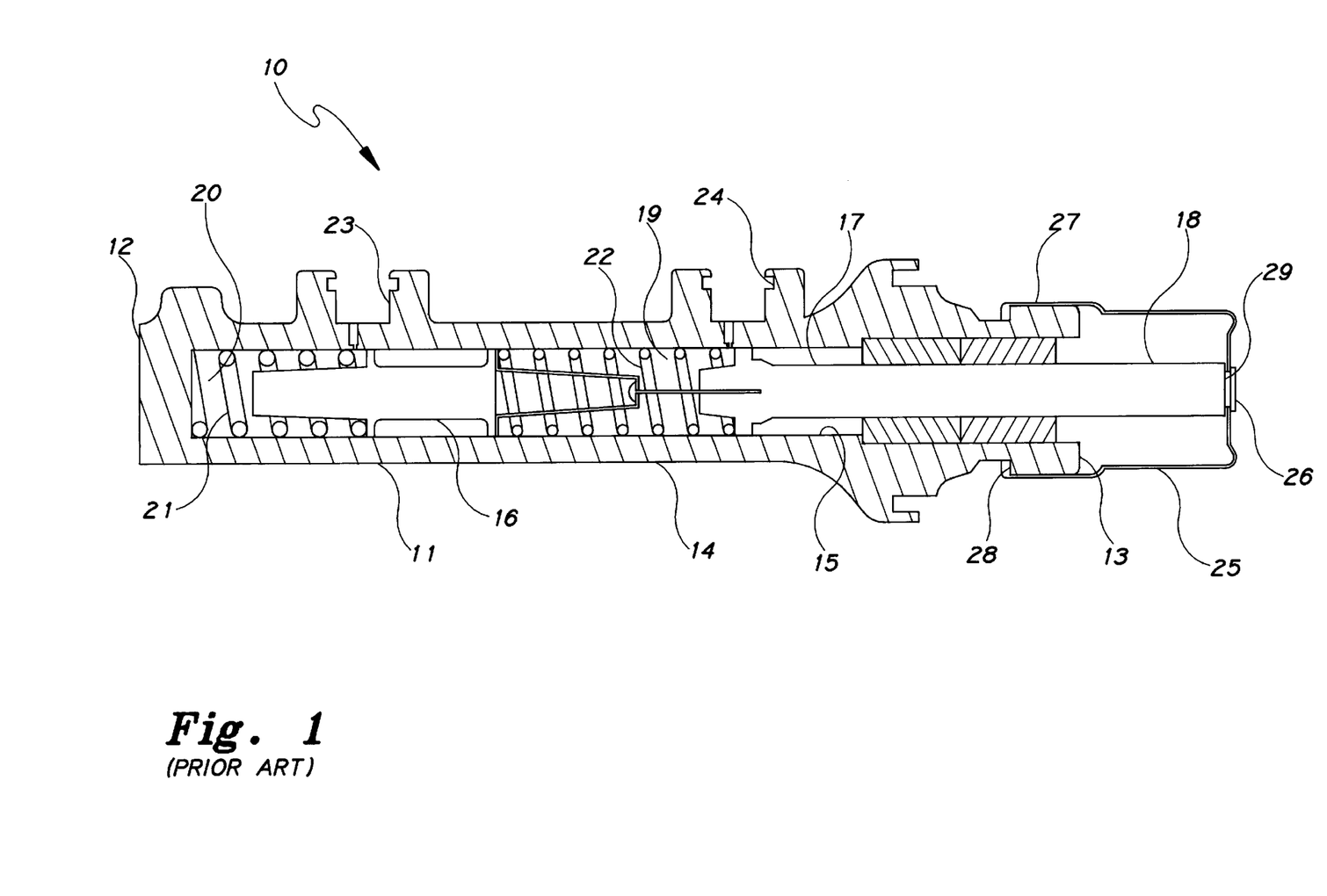
FIG. 1 is a sectioned side elevational view of a brake master cylinder assembly according to the prior art.

Referring now to FIG. 1, a typical brake master cylinder assembly 10 of the prior art is illustrated. The assembly includes a housing 11 having a rear end surface 12 separated from a front end surface 13 by a side surface 14. The housing includes an inner cavity 15 that opens through front end surface 13. A pair of plungers 16 and 17 are slidably positioned in inner cavity 15, but are biased toward their respective retracted positions by compression springs 21 and 22. A portion of inner cavity 15 and plunger 16 define a first sub-cavity 20 that opens to a reservoir (not shown) via port 23. Likewise, a portion of inner cavity 15, plunger 16 and plunger 17 define a second sub-cavity 19 that opens to a second reservoir (not shown) via a port 24. A portion of plunger 17 is a shaft 18 with one end extending into inner cavity 15 and an other end extending out of inner cavity 15 away from front end surface 13. Debris is kept out of inner cavity 15 by the inclusion of a collapsible rubber boot 25 that has a forward end 26 attached to shaft 18 via an annulus 29, and a base end 27 attached to side surface 14 of housing 11 at an annular shoulder 28. When assembly 10 is in operation, shaft 18 pushes plungers 17 and 16 inward toward an advanced position which closes ports 23 and 24 and provides pressurized hydraulic fluid from sub-cavities 19 and 20 to the vehicle's brakes via ports that are not shown in this sectioned view.

Figure 2:
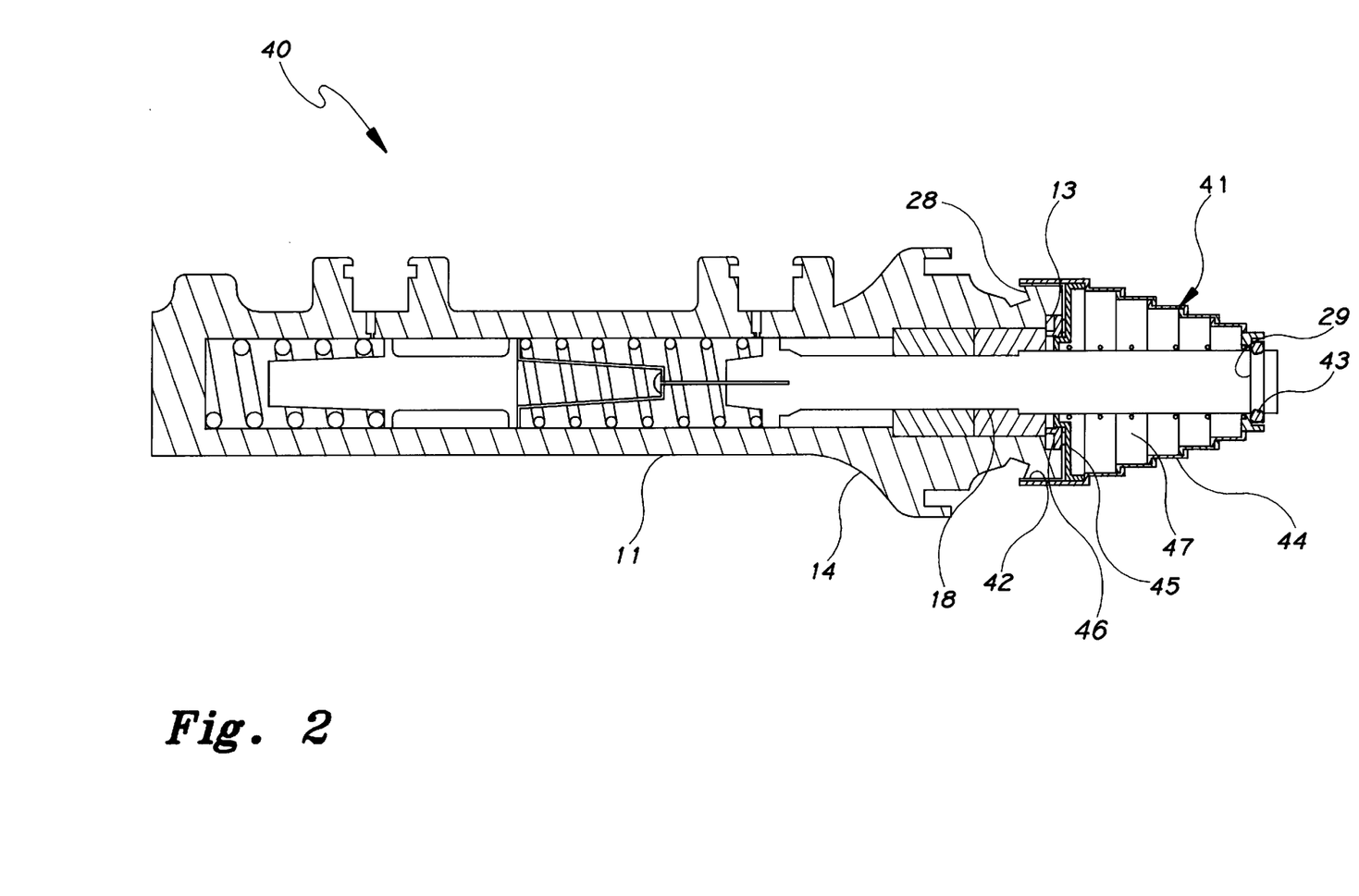
FIG. 2 is a sectioned side elevational view of a brake master cylinder assembly according to the present invention when the shaft is in its retracted position.

Referring now to FIG. 2, a brake master cylinder assembly 40 is substantially identical to assembly 10 of the prior art except that an electrical brakelamp switch 41 has been substituted for the rubber boot 25 of the prior art assembly 10. Brakelamp switch 41 includes a collapsible cover 44 made up of six nested concentric hollow cylinders. Collapsible cover 44 also includes a forward end that is attached to annulus 29 of shaft 18 via a press fitted rubber o-washer 43. Collapsible cover 44 also includes a base end 42 attached to side surface 14 of housing 11 via an inwardly directed ledge that is held in place against annular shoulder 28.

Figure 5:
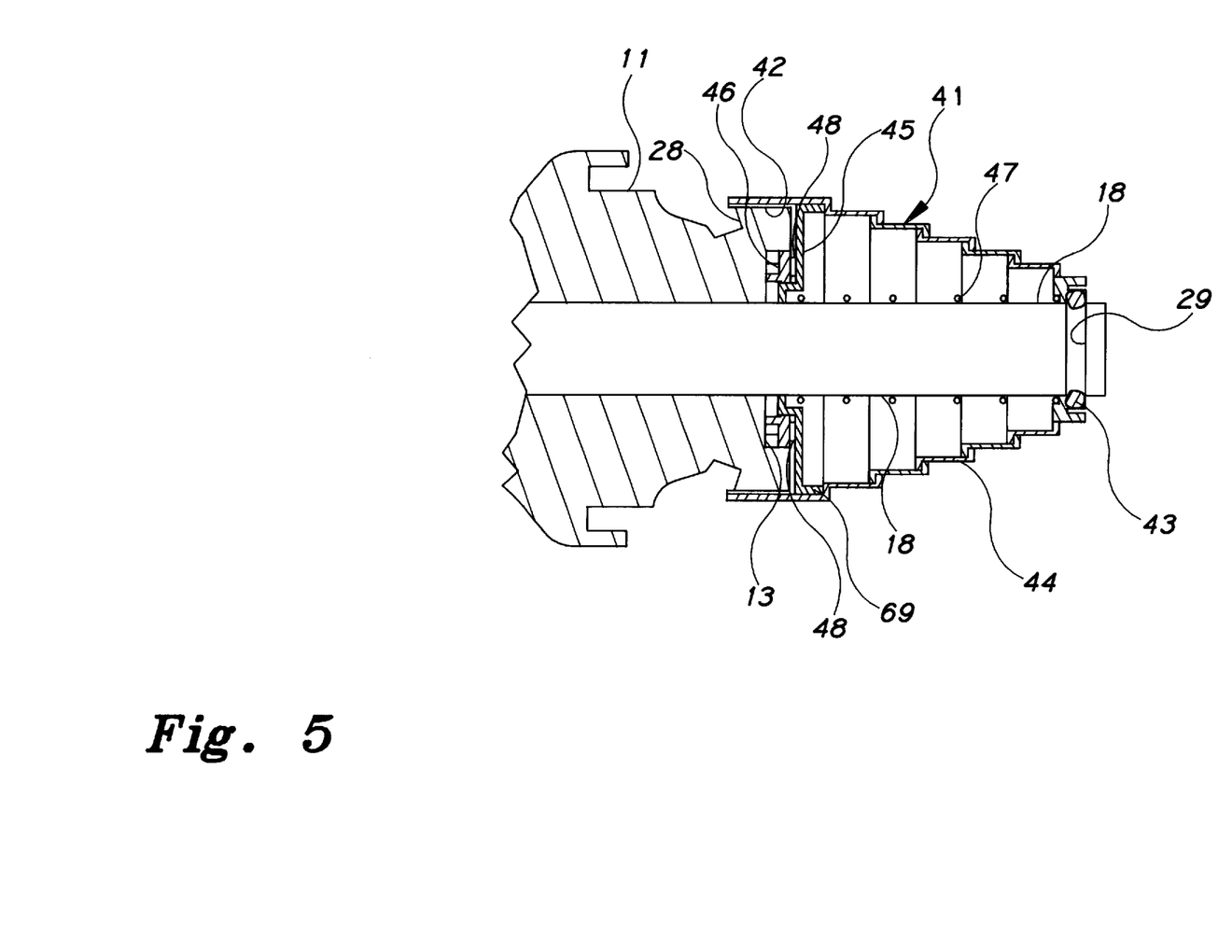
FIG. 5 is a partial sectioned side elevational view of a brake master cylinder assembly according to the present invention, when the shaft is in its retracted position.
Figure 6:
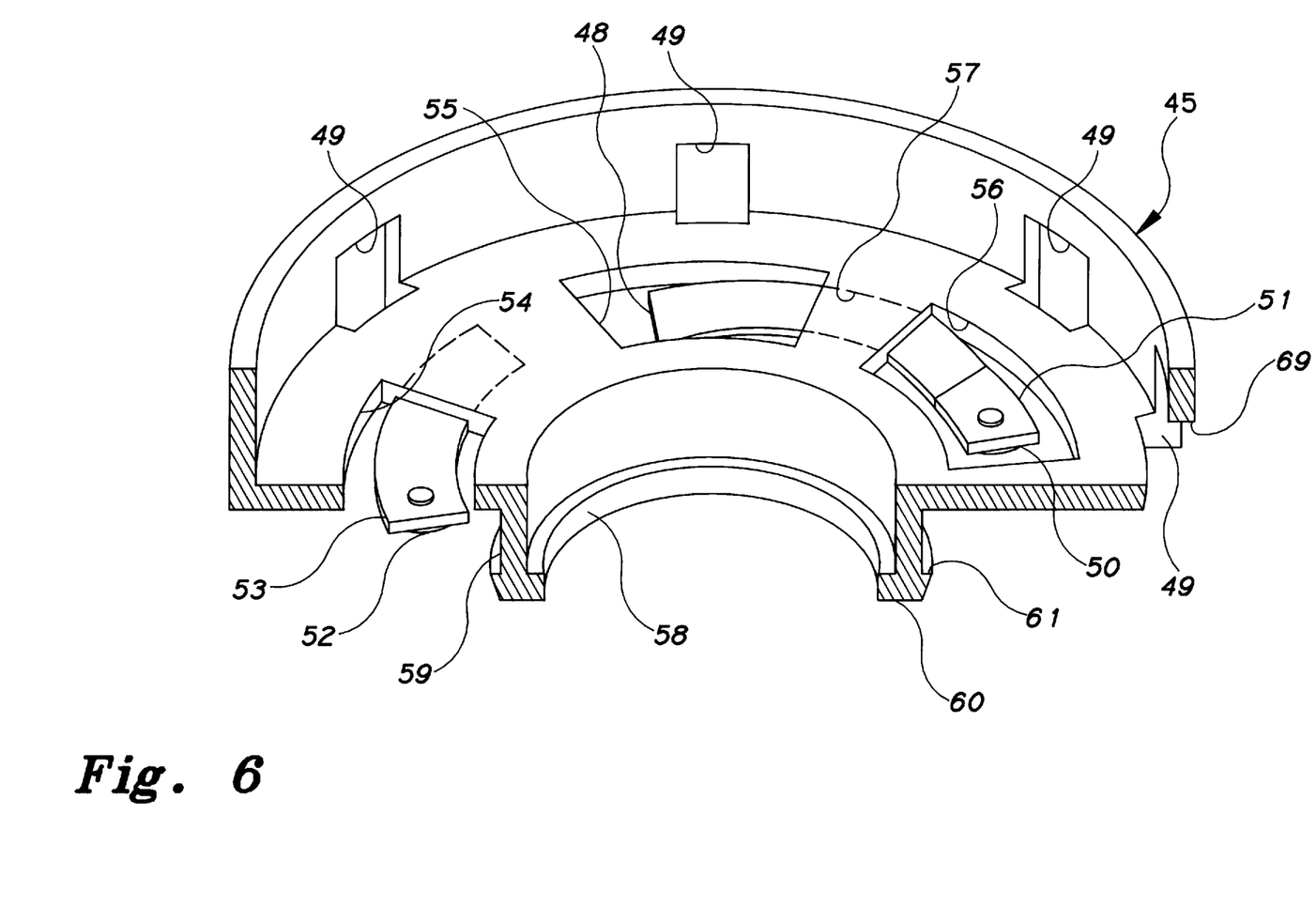
FIG. 6 is a sectioned isometric view of a moveable plate according to one aspect of the present invention.

An electrical brakelamp switch is positioned within collapsible cover 44 and includes a moveable plate 45 and a stationary plate 46 that is positioned adjacent the front end surface 13 of housing 11. Applicants use the term "adjacent" herein to mean that the stationary plate is in contact with front end surface 13 or in close proximity thereto at a distance preferably less than about one millimeter. Larger distances could be tolerated but would necessarily require further brake pedal travel to activate the switch. Stationary plate 46 is preferably nominally 0.5 millimeters away from front end surface 13 with a variance of ±0.5 millimeters. Moveable plate 45 is biased away from stationary plate 46 via a pair of cantilever springs 48 that are best seen in FIGS. 5 and 6. Assembly 40 also includes a compression spring 47 with one end in contact with the inner surface of collapsible cover 44 and an other end in contact with moveable plate 45. Collapsible cover 44, moveable plate 45 and stationary plate 46 are preferably molded from a suitable substantially rigid plastic, such as glass filled polyester or nylon.

Figure 3:
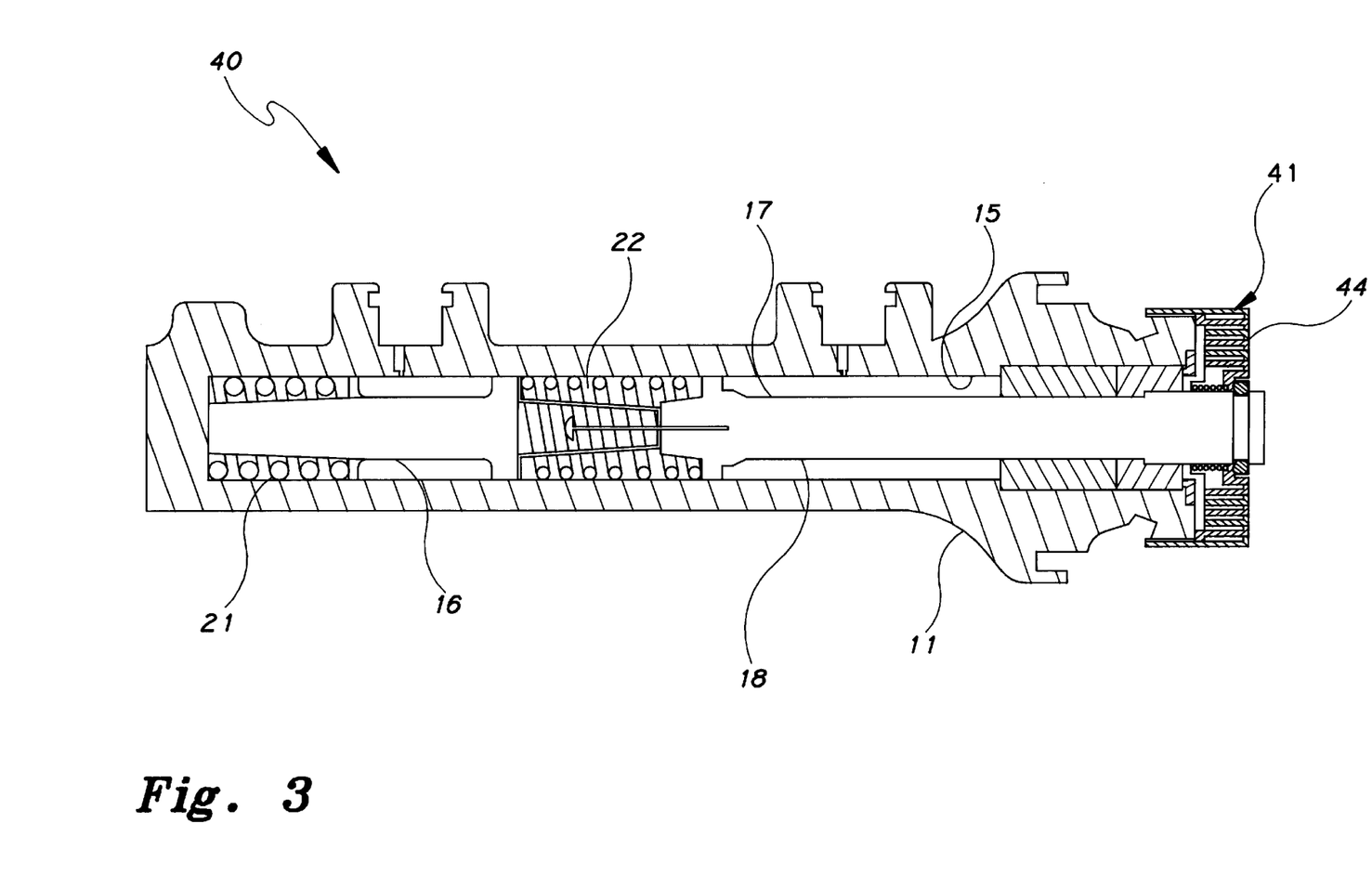
FIG. 3 is a sectioned side elevational view of a brake master cylinder assembly according to the present invention when the shaft is in its advanced position.
Figure 4:
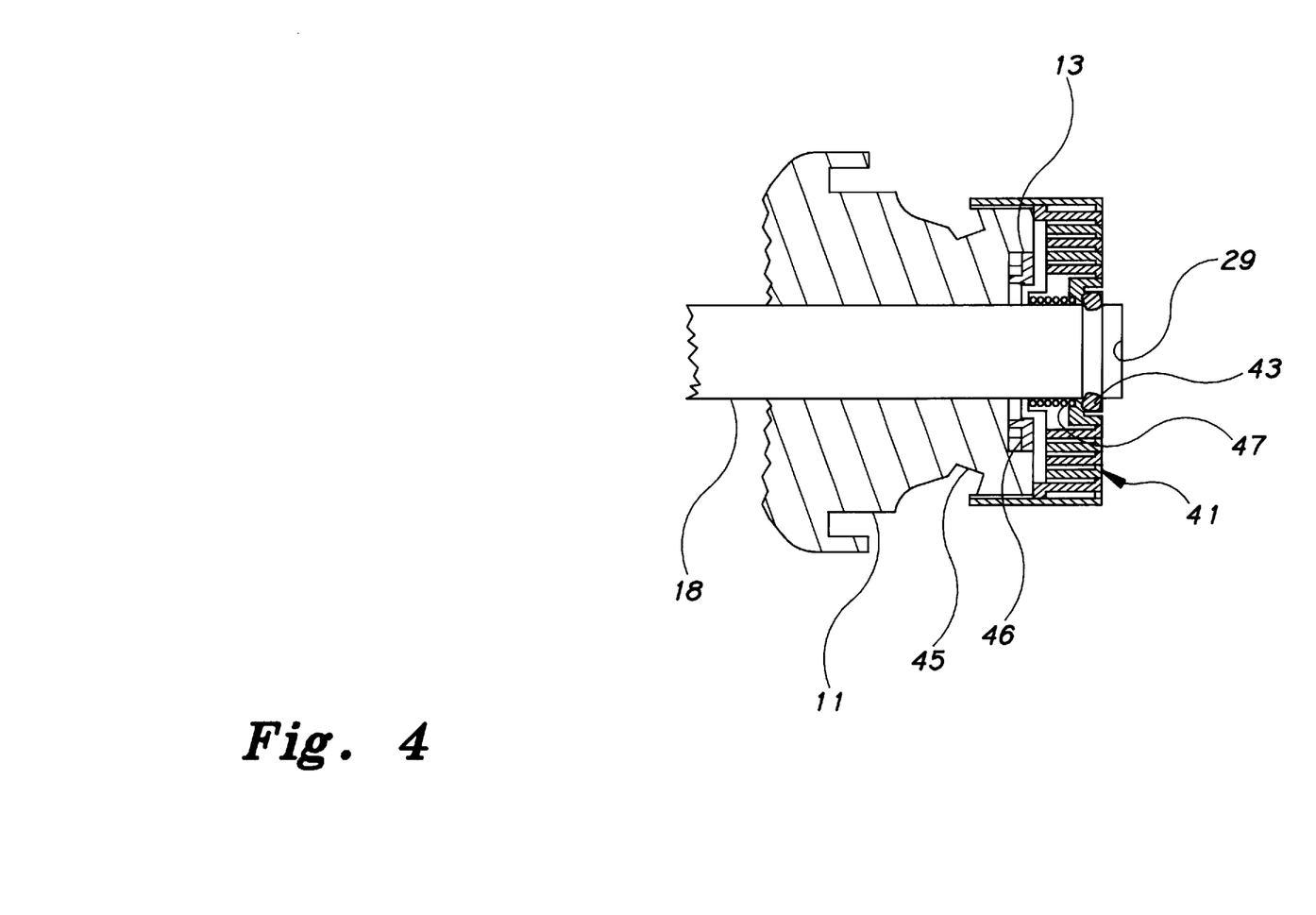
FIG. 4 is an enlarged partial sectioned side elevational view of a brake master cylinder assembly according to the present invention, when the shaft is in its advanced position.

Referring now to FIG. 3, assembly 40 is shown in its position in which shaft 18 is at its advanced position such that plungers 16 and 17 are moved to their further most position in inner cavity 15. This position represents the condition when hydraulic fluid is lost and there is nothing to prevent shaft 18 from going to its advanced position. Because brake stop lamp switch 41 is designed to accommodate this possibility, it remains undamaged if shaft 18 is pushed to its advanced position. In other words, the nested concentric hollow cylinders of collapsible cover 44 are sized and arranged such that they simply become nested within one another without resisting movement of shaft 18 into inner cavity 15. Thus, brake stop lamp switch 41 would remain undamaged when plungers 16 and 17 are returned to their retracted positions by compression springs 21 and 22. Damage is prevented by making the maximum height of each nested hollow cylinder less than the distance from annulus 29 to front end surface 13 when shaft 18 is at its advanced position.

Referring now to FIGS. 4–7, cantilever springs 48 bias moveable plate 45 away from stationary plate 46 until ledge 61 comes in contact with the underside 68 of stationary plate 46. Compression spring 47 is preferably chosen to be stronger than cantilever springs 48 such that the cantilever springs yield before the compression spring 47 yields when shaft 18 is moved into inner cavity 15 of housing 11. This feature of compression spring 47 combined with the fact that the moveable plate 45 is coupled to the nested concentric hollow cylinders via surface 69 causes collapsible cover 44 to be urged to its fully extended position rather than urging moveable plate 45 toward stationary plate 46. Thus, moveable plate 45 can be positioned relative to stationary plate 46 with a reliable distance separation that does not need adjustment at the time of installation. This separation distance is preferably maintained at a distance less than about 3 millimeters.

When the brake pedal is compressed, movement of shaft 18 moves the complete switch assembly 41 until stationary plate 46 contacts the front end surface 13 of housing 11, unless it was already in contact. Further movement of shaft 18 causes the outer most moveable housing component that contains o-ring 43 against moveable plate 45 via compression spring 47 causing cantilever springs 48 to yield. After sufficient deflection by cantilever springs 48, electrical contact buttons 50 and 52 (FIG. 6) come in contact with electrical contacts 66 and 67 (FIG. 7) closing the circuit and actuating the brake stop lamps and possibly disengaging cruise control. Buttons 50 and 52 are preferably made of a suitable silver alloy. The total shaft movement necessary to actuate the switch is nominally and preferably on the order of about 2.5 millimeters. After moveable plate 45 has been moved into contact with stationary plate 46, compression spring 47 begins to yield causing the nested concentric hollow cylinders to nest within one another. Electrical contacts 50 and 52 are attached to cantilever springs 51 and 53 in a manner well known in the art.

Moveable plate 45 is formed to include a plurality of rectangular shaped openings 49 that receive corresponding projections in the first hollow cylindrical portion of a collapsible cover 44. When moveable plate 45 is fabricated, it includes cantilever springs 51 and 53 imbedded therein. Cantilever spring 48 is actually a portion of cantilever spring 51 and includes a middle section embedded in area 57 of moveable plate 45. Moveable plate 45 is also fabricated to include a plurality of openings 54, 55 and 56 so that cantilever springs 51 and 53, with attached contacts 50 and 52, as well as cantilever spring 48 can deflect allowing moveable plate 45 to come into contact with moveable plate 46 without any over stressing of the structure and to permit some mechanical wiping of the electrical contact surfaces 66 and 67. The cantilever springs 51 and 53 are mounted to insure design intent contact force, provide design intent contact at several locations and provide mechanical wipe at the contact points.

Figure 7:
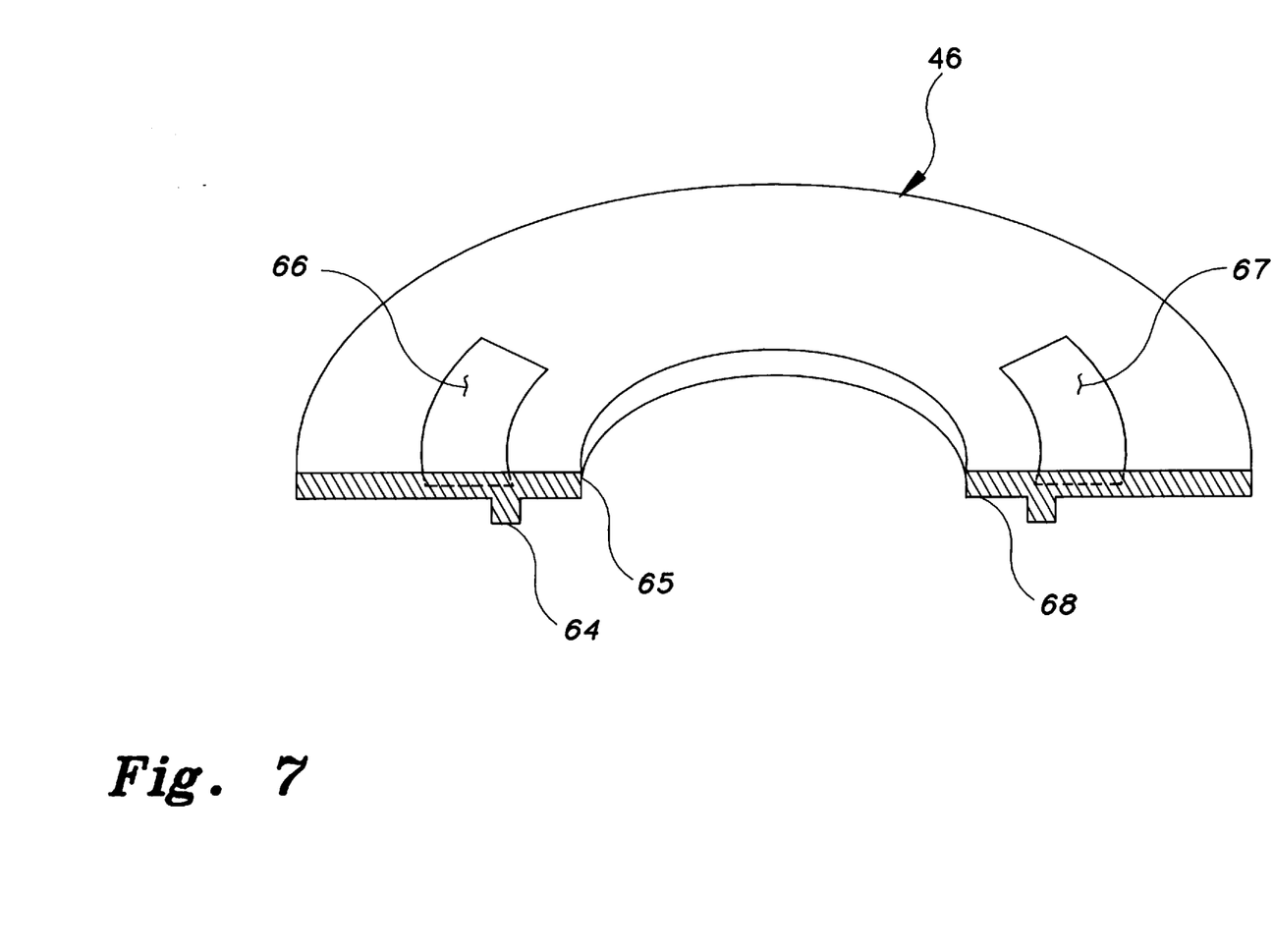
FIG. 7 is a sectioned isometric view of a stationary plate according to one aspect of the present invention.

Cantilever springs 51 and 53 are preferably made from a suitable spring tempered copper alloy of a type known in the art. Shaft 18 is received through a circular opening 58 in moveable plate 45. When assembled, the circular opening 65 of stationary plate 46 moves within a channel 59 in moveable plate 45. When the two plates are separated due to the force of cantilever springs 48, such that underside 68 of stationary plate 46 is urged against annular shoulder 61 of moveable plate 45. Stationary plate 46 is formed to include embedded electrical contacts 66 and 67 preferably copper with conductive plating) that form electrical circuits when electrical contacts 52 and 50 come in contact therewith. A suitable wiring harness is attached to moveable plate 45 or stationary plate 46 in order to complete the circuitry and incorporate the electrical contacts into the electrical system of a vehicle.

Figure 8:
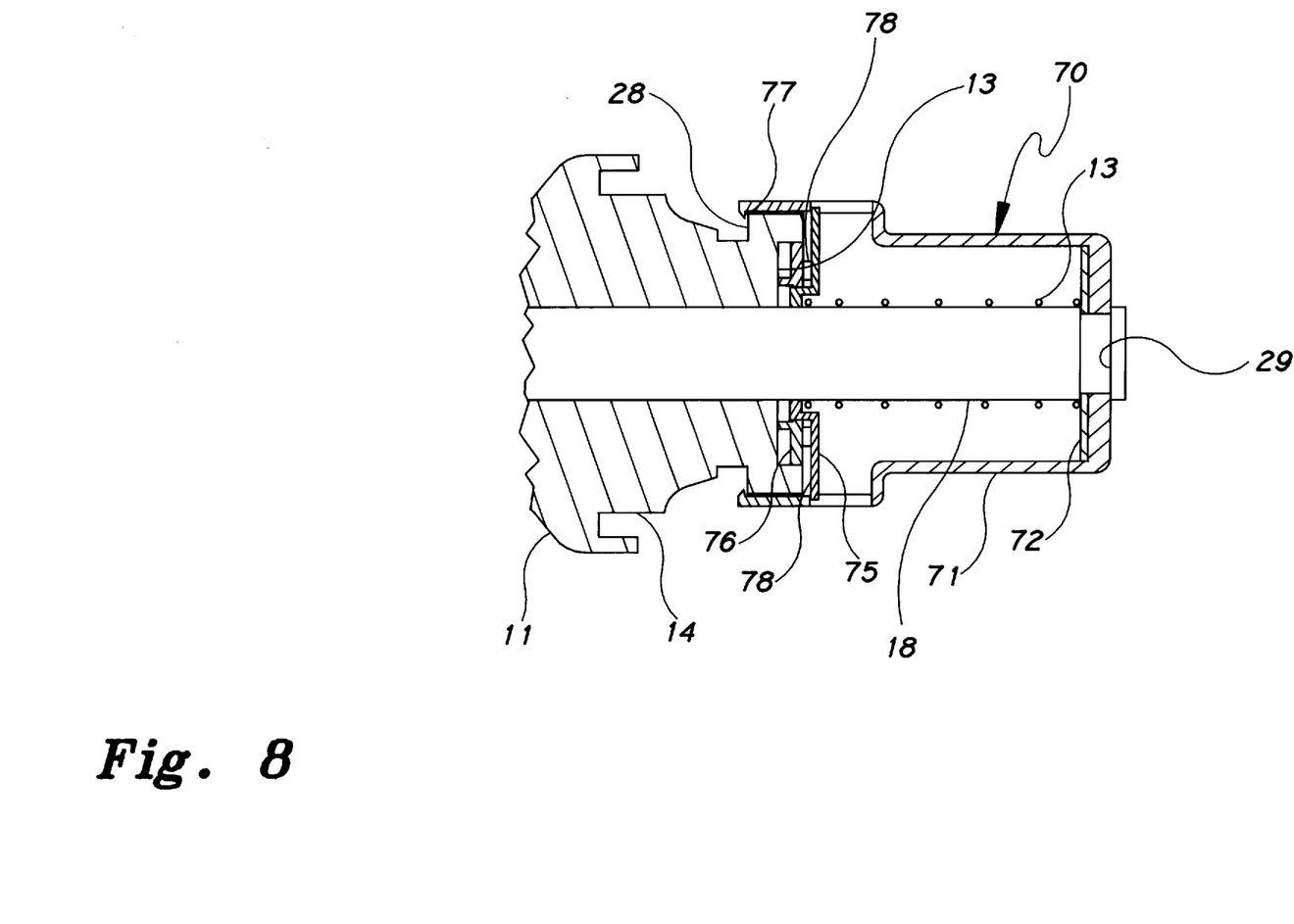
FIG. 8 is a partial sectioned side elevational view of a brake master cylinder assembly according to another embodiment of the present invention, when the shaft is in its retracted position.

Referring now to FIG. 8, a second embodiment of the present invention is substantially similar to the first embodiment except that electrical switch assembly 70 includes a rubber boot 71 substituted in place of the nested hollow concentric cylinders of the previous embodiment. As in the previous embodiment, collapsible cover 71 (rubber boot) is attached on a forward end to annulus 29 and attached at its other end to side surface 14 of housing 11 via an extension 77 that attaches to an annular shoulder 28 on housing 11. Like the previous embodiment a pair of cantilever springs 78 bias moveable plate 75 away from stationary plate 76. Also, like the previous embodiment a compression spring 73 is positioned on one end in contact with boot 71 via washer 72 and on its other end with an indention made in moveable plate 75. As in the previous embodiment, compression spring 73 is made stronger than the spring force produced by cantilever springs 78 so that cantilever springs 78 yield before compression spring 73 yields when shaft 18 is pushed inward. However, it is important that rubber boot 71 be made from a suitable material and have a sufficiently high durometer that resists stretching when shaft 18 is in its retracted position. This will prevent compression spring 73 from pushing moveable plate toward stationary plate 76 to accidentally actuate the switch when shaft 18 is in its retracted position. As an alternative with the suitable material for rubber boot 71, it may be possible to eliminate compression spring 73 and rely upon the elastic nature of the rubber boot to supply the compression spring force otherwise produced by spring 73, without otherwise altering the function of the unit.

Figure 9:
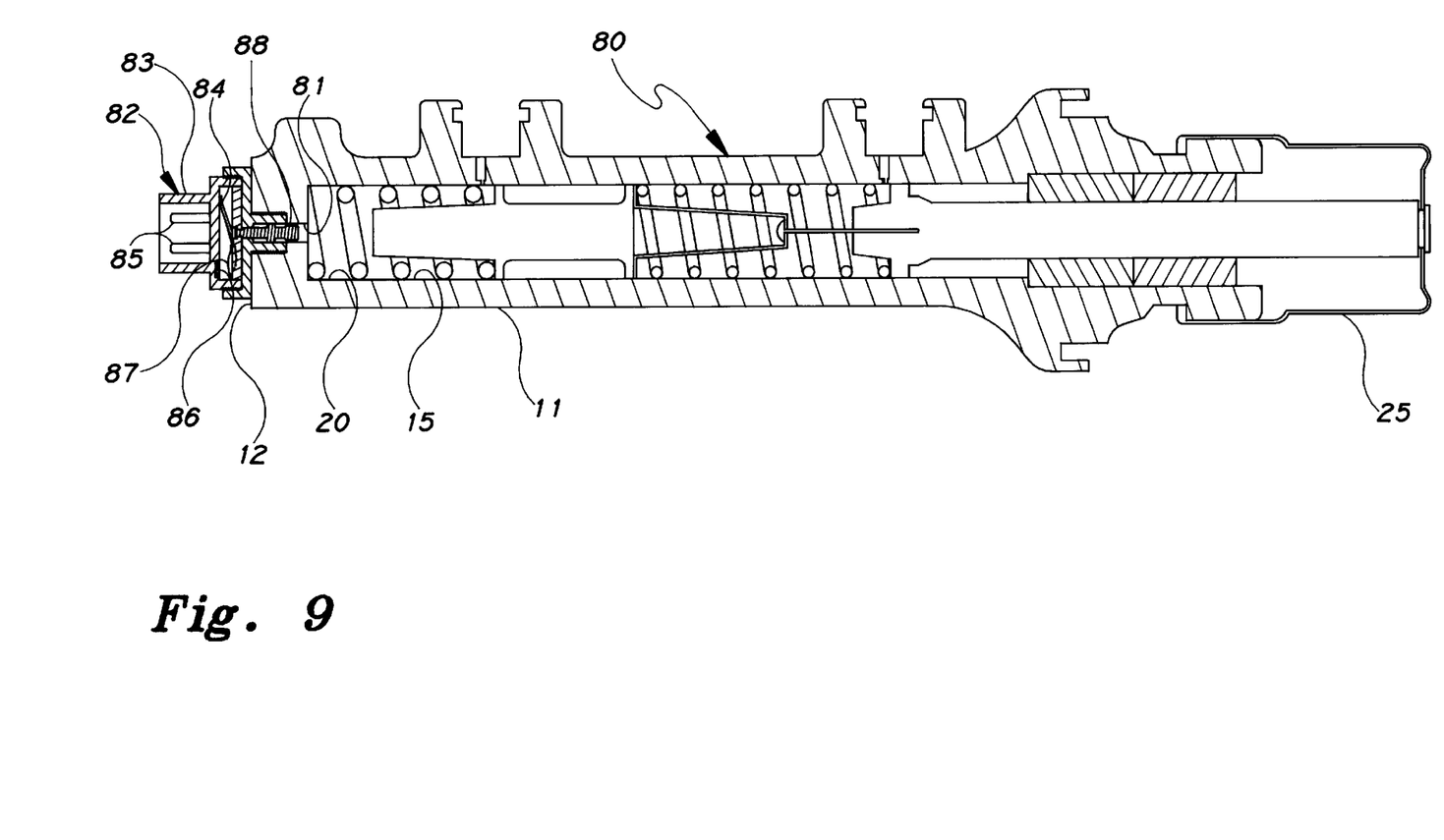
FIG. 9 is a sectioned side elevational view of a brake master cylinder assembly according to still another embodiment of the present invention.

Referring now to FIG. 9, still another embodiment of the present invention is a brake master cylinder assembly 80 that is substantially identical to the prior art assembly except that it includes a bore 81 that extends between inner cavity 15 and rear end surface 12. A hydraulically actuated electrical brakelamp switch 82 is attacked in contact with rear end surface 12 of housing 11. The rubber boot 25 of assembly 80 is substantially identical to the rubber boot of the prior art assembly 10 shown in FIG. 1.

Figure 10:
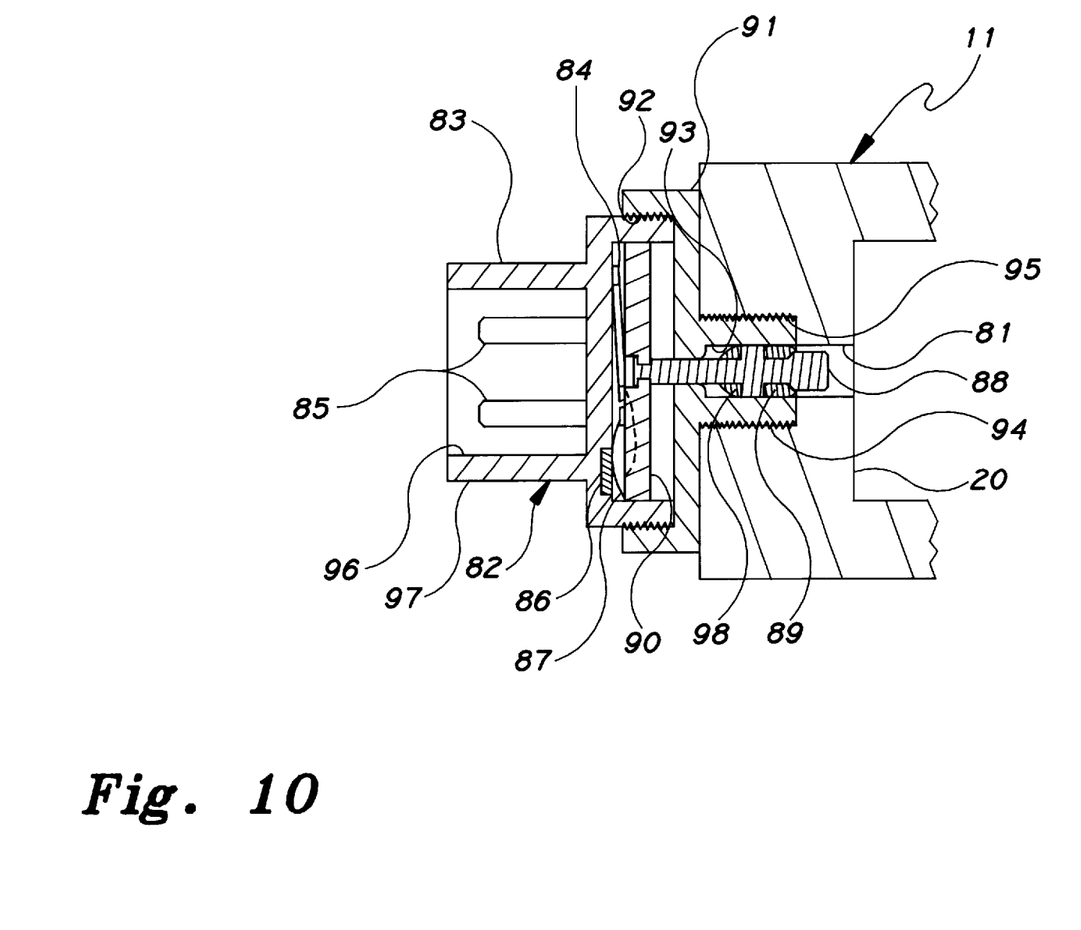
FIG. 10 is a partial sectioned side elevational view of a brake master cylinder assembly according to the embodiment shown in FIG. 9 when the switch is activated.
Figure 11:
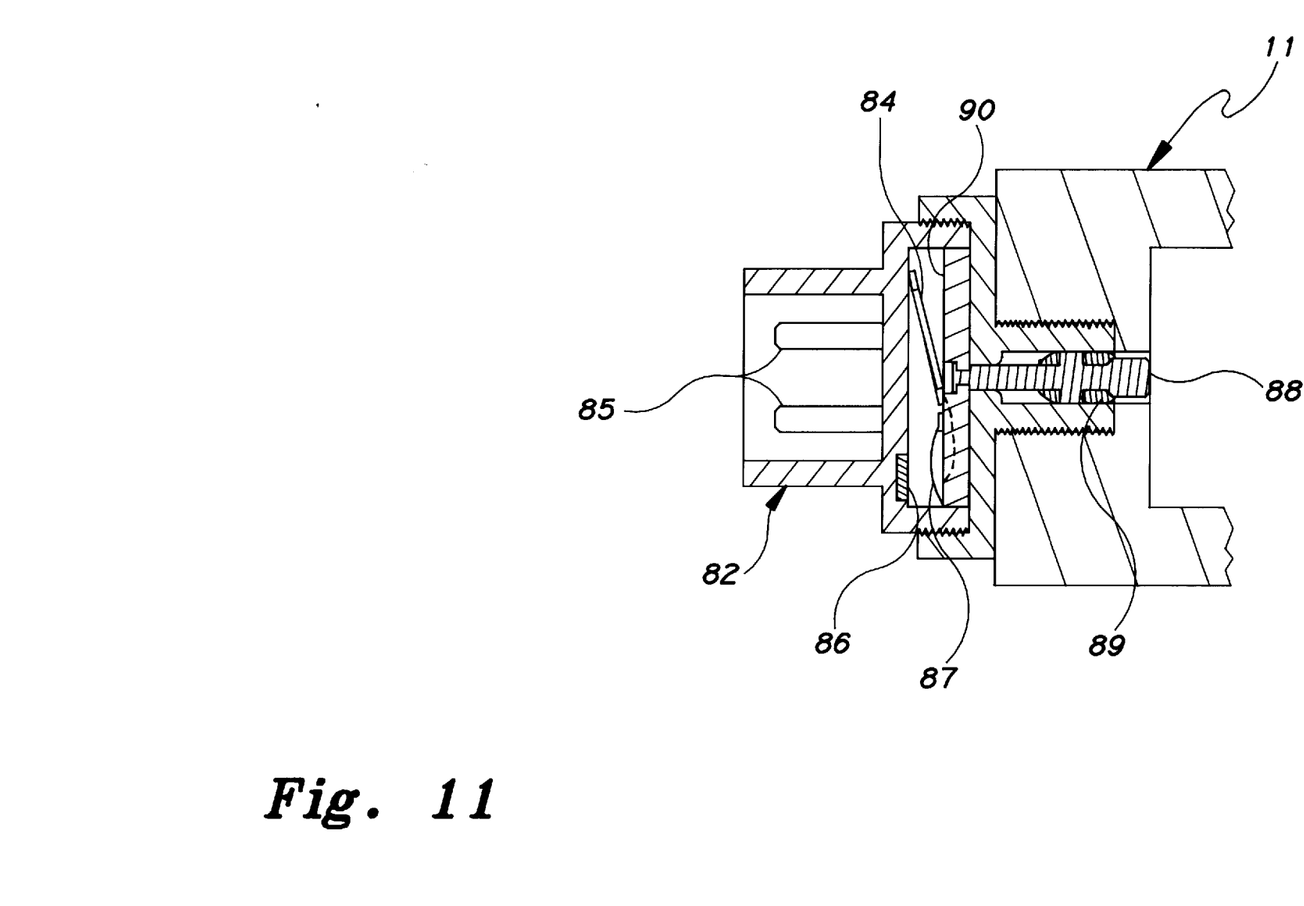
FIG. 11 is a partial sectioned side elevational view of the brake master cylinder assembly according to the embodiment shown in FIG. 9 when the switch is de-activated.

Referring now also in FIGS. 10 and 11, electrical stop lamp switch 82 includes a metallic housing 91 that has an internal bore 93 sized to slidably receive a metallic plunger 88. Plunger 88 includes a rubber o-ring seal 89 and a v-ring seal 98 that together prevent hydraulic fluid from escaping from within housing 11 and prevent air from the outside from entering the same. As stated earlier, housing 11 includes a bore 81 which in this case includes a set of internal threads 95 that are matched to receive external threads 94 made on the outer surface of the barrel portion of housing 91. Metallic housing 91 also includes on its opposite side a set of threads that allow it to mate to a plastic housing portion 97 that carries conductors 85 that allow the switch to be connected to a wiring harness (not shown) of a vehicle. Plastic housing portion 97 also is formed to include a conductor contact 86 which acts to complete the circuit and activate a switch when conductor button 87 is in contact therewith as shown in FIG. 10. Conductor button 87 is attached to a cantilever spring 84 which is partially embedded in a plastic movable plate 90, which is attached to plunger 88. Thus, in this case, plastic housing 97 acts as the stationary portion of the switch, and moveable plate 90 along with plunger 88 act as the moveable portion of the switch. As shown in FIG. 11, cantilever spring 84 normally biases moveable plate 90 away from electrical contact 86 to maintain the circuit open until sufficient hydraulic pressure within housing 11 causes plunger 88 to push contact 87 into electrical contact with contact 86. Plunger 88 is preferably sized such that it is moved to make the necessary electrical contacts during the first few millimeters of movement of the shaft into brake cylinder housing 11.

All embodiments of the present invention include a means of preventing damage to the switch in the event of fluid loss within the brake master cylinder housing and movement of the shaft to its advanced position. In the case of the first two embodiments, they are designed to collapse in this eventuality without resistance, other than compression of a spring. In the third embodiment, its plunger simply remains stationary without damage if fluid loss occurs and is positioned so as not to come in physical contact with other parts in case of this eventuality.

Those skilled in the art will appreciate that the above description is intended for illustrative purposes only and is not intended to limit the scope of the present invention in any way. For instance, various components of the various switches illustrated can be made from a wide variety of suitable materials without otherwise departing from the spirit of the present invention. Furthermore, those skilled in the art will appreciate that various changes can be made to the disclosed embodiments without departing from the scope or spirit of the invention as defined in the claims as set forth below.

We claim:

1. A brake master cylinder assembly comprising:

a brake master cylinder housing having a rear end surface separated from a front end surface by a side surface, and defining an inner cavity that opens through said front end surface;

at least one plunger movably positioned in said inner cavity;

a shaft with one end extending into said inner cavity in contact with said at least one plunger and other end extending out of said inner cavity away from said front end surface, and being moveable into said inner cavity between a retracted position and an advanced position;

an electrical brakelamp switch attached to said brake master cylinder housing adjacent one of either said front end surface or said rear end surface;

said electrical brakelamp switch having a stationary portion with at least one first electrical contact, and a moveable portion with at least one second electrical contact positioned across from said at least one first electrical contact; and means for preventing damage so constructed and located on the master cylinder housing as to prevent damage to said electrical brakelamp switch in the event of hydraulic fluid loss within said brake master cylinder housing and advancement of said shaft to said advanced position.

2. The brake mister cylinder assembly of claim 1 further comprising means for biasing said moveable portion a separation distance away from said stationary portion.

3. The brake master cylinder assembly of claim 2 wherein said means for biasing includes at least one cantilever spring; and said at least one cantilever spring is a portion of one of either said at least one first electrical contact or said at least one second electrical contact.

4. The brake master cylinder assembly of claim 3 wherein said moveable portion is plastic and molded with said at least one second electrical contact embedded therein; and said at least one second electrical contact includes a spring blade with a conductor button attached to one end and having an opposite end in contact with said stationary portion.

5. The brake master cylinder assembly of claim 4 wherein said separation distance is less than about 3 millimeters.

6. The brake master cylinder assembly of claim 4 wherein said electrical brakelamp switch is hydraulically actuated and attached to said brake master cylinder housing in contact with said rear end surface; and said brake master cylinder housing defining a port extending between said inner cavity and said rear end surface, and said port opening to said electrical brakelamp switch.

7. The brake master cylinder assembly of claim 6 wherein said electrical stoplamp switch includes a housing having said stationary portion and a barrel that opens to said port; and said moveable portion of said electrical stoplamp switch includes a plunger positioned in said barrel with one end contacting hydraulic fluid from said port and an other end attached to said moveable portion.

8. The brake master cylinder assembly of claim 7 wherein part of said port is defined by a set of internal threads; and said barrel includes a set of external threads that mate to said set of internal threads.

9. The brake master cylinder assembly of claim 4 wherein said stationery portion and said moveable portion surround said shaft and are contained within a collapsible cover.

10. The brake master cylinder assembly of claim 9 wherein said collapsible cover includes an inner surface; and a compression spring with one end in contact with said inner surface and an other end in contact with said moveable portion.

11. The brake master cylinder assembly of claim 10 wherein said compression spring is stronger than said at least one cantilever spring such that said at least one cantilever spring yields before said compression spring yields when said shaft is moved into said inner cavity of said brake master cylinder housing.

12. The brake master cylinder assembly of claim 11 wherein said collapsible cover includes a plurality of nested concentric hollow cylinders that are substantially rigid.

13. The brake master cylinder assembly of claim 11 wherein said collapsible cover includes a rubber boot; and said compression spring has insufficient strength to stretch said boot.

14. A brake master cylinder assembly comprising:

a brake master cylinder housing having a rear end surface separated from a front end surface by a side surface, and defining an inner cavity that opens through said front end surface;

at least one plunger movably positioned in said inner cavity;

a shaft with one end extending into said inner cavity in contact with said at least one plunger and an other end extending out of said inner cavity away from said front end surface, and being moveable into said inner cavity between a retracted position and an advanced position;

a collapsible cover surrounding a portion of said shaft and having a forward end attached to said shaft and a base end attached to said brake master cylinder housing, and said collapsible cover being substantially uncollapsed when said shaft is in said retracted position but becoming substantially fully collapsed when said shaft is at said advanced position;

an electrical brakelamp switch attached to said brake master cylinder housing adjacent said front end surface and positioned within said collapsible cover;

said electrical brakelamp switch having a stationary plate with at least one first electrical contact, and a moveable plate with at least one second electrical contact positioned across from said at least one first electrical contact; and means for preventing damage so constructed and located on the master cylinder housing as to prevent damage to said electrical brakelamp switch in the event of hydraulic fluid loss within said brake master cylinder housing and advancement of said shaft to said advanced position.

15. The brake master cylinder assembly of claim 14 further comprising means for biasing said moveable plate a separation distance away from said stationary plate; and a compression spring mounted between said moveable plate and said collapsible cover.

16. The brake master cylinder assembly of claim 15 wherein said means for biasing is at least one cantilever spring; and said compression spring is stronger than said at least one cantilever spring such that said at least one cantilever spring yields before said compression spring yields when said shaft is moved from said retracted position toward said advanced position.

17. The brake master cylinder assembly of claim 16 wherein said at least one first electrical contact is separated from said at least one second electrical contact by less than about 3 millimeters when said shaft is in said retracted position.

18. The brake master cylinder assembly of claim 17 wherein said at least one second electrical contact and said at least one cantilever spring are an integral piece; and said moveable plate is plastic and molded with said integral piece embedded therein.

19. The brake master cylinder assembly of claim 18 wherein said collapsible cover includes a plurality of nested concentric hollow cylinders that are substantially rigid.

20. The brake master cylinder assembly of claim 19 wherein said collapsible cover includes a rubber boot; and said compression spring has insufficient strength to stretch said boot.

* * * * *